United States Patent Office

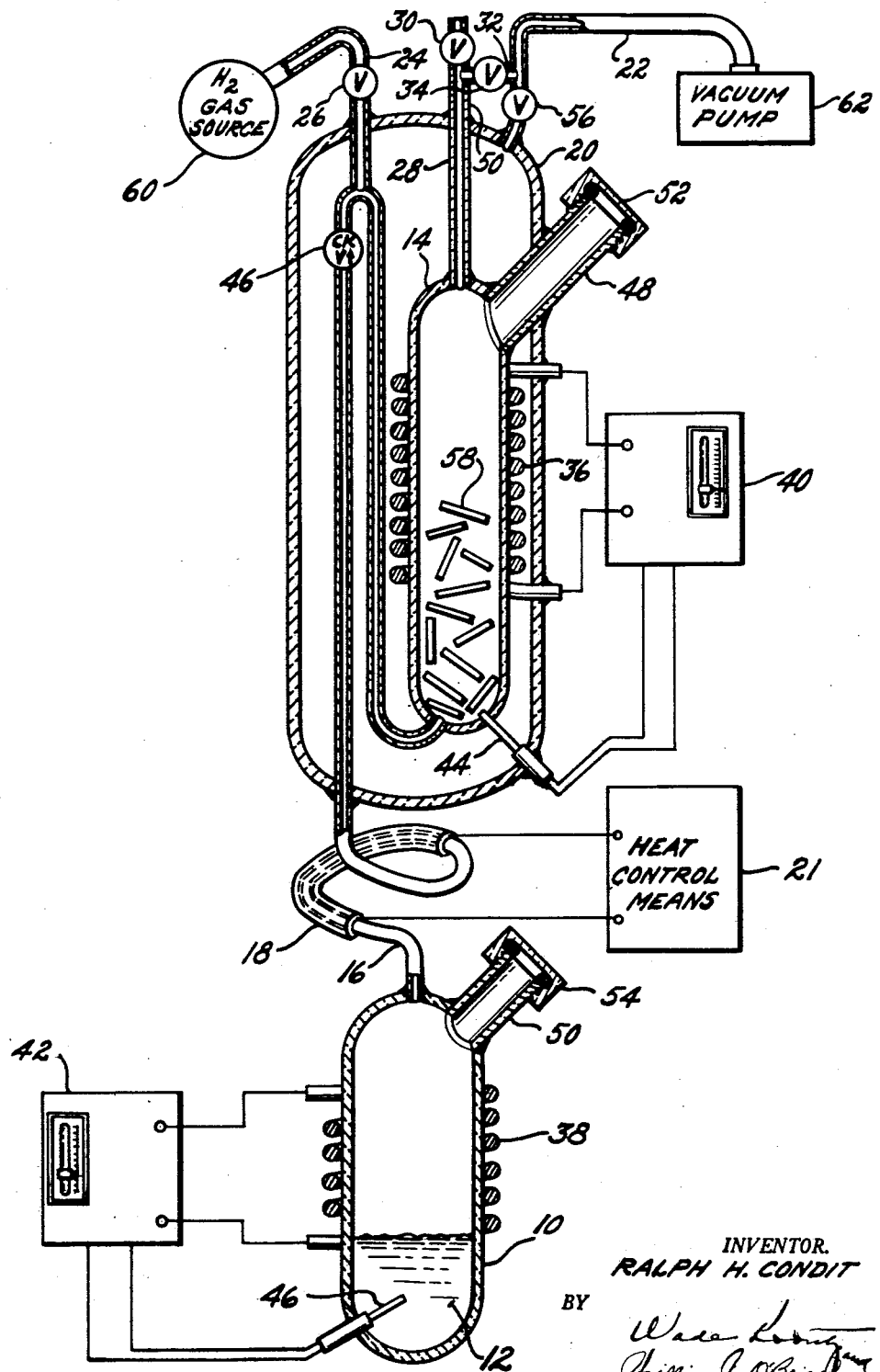

3,039,857
Patented June 19, 1962

3,039,857
APPARATUS FOR GROWING PURE CRYSTALS
Ralph Howell Condit, Livermore, Calif., assignor to the United States of America as represented by the Secretary of the Air Force
Filed July 26, 1960, Ser. No. 45,516
5 Claims. (Cl. 23—260)

This invention relates to an apparatus for growing crystals and, more particularly, to an apparatus for growing crystalline compounds produced by reacting non-metals selected from groups Vb and VIb of the periodic table with metals selected from the transition elements.

The crystalline compound semiconductors are true chemical compounds of two or more elements characterized by having particular stoichiometric compositions which, in general, deviate from the normal. The high degree of sensitivity and desirable response characteristics exhibited by such compounds, when stimulated by a variable or constant voltage source, make them especially useful in transistor and rectifier technology.

The crystalline compounds to which this invention relates are binary metal compounds and include, for example, metallic oxides, sulfides, tellurides, selenides, phosphides, and arsenides, and are of particular significance because of their antiferromagnetic properties, their value for use in thermoelectric devices, and the fact that many of them are semiconductors.

However, prior to the apparatus of this invention, the use of such compounds was limited by the high cost and difficulties encountered in producing crystals of a desirable size and purity. The task of producing high purity crystals, heretofore, was impeded because of the unusual characteristics which these materials possess. The crystals, upon cooling from their freezing point to room temprature, often underwent changes in their lattice parameters and cracked their containers with resultant undesired oxidation and contamination. Further, semiconductors generally have a range of composition which deviates from the stoichiometric and in order to achieve versatility in use, their elemental ratios must be controlled with great precision.

Accordingly, it is a principal object of this invention to circumvent the above-described limitations of the prior art and produce crystalline compounds of large size, free from contamination and having a versatility in use.

A further object of this invention is to provide a new and improved apparatus for producing crystalline compounds which exhibit semiconductor characteristics.

A still further object of this invention is to provide a new and improved apparatus for producing crystalline compounds by effectuating a reaction between a non-metallic element selected from groups Vb and VIb of the periodic table and an element selected from the transition metals.

Another object of this invention is to provide a new and improved apparatus for producing compound semiconductors economically and in good quantity.

Still another object of this invention is to provide an apparatus for producing compound semiconductor crystals utilizing conventional, currently available materials which lend themselves to mass production techniques.

A still further object of this invention is to provide a novel apparatus for producing compound semiconductor crystals which lessens the chance of contamination by breakage.

A still further object of this invention is to provide a new and improved apparatus for effectuating a rapid reaction between vapors of a non-metallic element and a molten metallic element so as to promote the rapid growth of highly pure crystals of the resultant compound.

A still further object of this invention is to provide a new and improved apparatus for producing crystalline compounds wherein the elemental ratios of said compounds are closely controlled so as to effectuate a wide versatility with respect to their future use.

These and still other objects, features and advantages of this invention will become readily apparent to those skilled in the crystal growing art by an examination of the following detailed description thereof and the accompanying drawings.

In the drawing, a single elevational view, partly in section and partly diagrammatic, illustrates an example of the apparatus used in the production of the compound crystals of the present invention.

With continued reference to the drawing, there is disclosed a crystal growing apparatus which comprises a lower vaporization chamber 10 for holding a charge of non-metal 12, a reaction chamber 14 positioned above the chamber 10 and connected thereto by a conduit means 16. Conduit 16 is generally coiled in order to take up the strain of thermal expansion. The reaction chamber 14 holds a charge of metal 58 which is to be reacted with vapors of the non-metal 12 emanating from chamber 10 in order to produce the desired compound crystals.

A heating element 18 blankets conduit 16 and, in conjunction with a conventional heating control means designated at 21, maintains an elevated temperature within desired limits within conduit 16 in order to prevent condensation of the non-metallic vapors passing therethrough.

Surrounding the reaction chamber 14 is an envelope 20 which is connected to a vacuum pump 62 for evacuating the interior portion thereof by a pipe 22 having valve means 56. The evacuation of the envelope will insure freedom from contamination during operation of the apparatus in the event that the reaction chamber becomes damaged or cracked during production of the crystals. A tube 24, having a shut-off valve 26 for allowing the entrance of hydrogen gas from the pressurized source 60, is sealed within the envelope 20 and is connected to the bottom of the reaction chamber 14. Tube 28 with a shut-off valve 30 is provided at the top of the reaction chamber 14 for evacuating hydrogen gas after it has passed over the metal charge 58 contained within the reaction chamber. A conduit 32 with a shut-off valve 34 interconnects tube 22 and tube 28 in order to provide a connection to the vacuum pump for evacuating the entire apparatus.

The reaction chamber 14 and vaporization chamber 10 are heated by separate induction, heating coils 36 and 38. These heating coils are individually connected to a conventional heat control and indicating means designated at 40 and 42. Positioned within the chambers 10 and 14 are thermocouples 44 and 46 for measuring and controlling the temperatures within the chambers in conjunction with heat control means 40 and 42.

A check valve 46 may be included in the apparatus and would be affixed to the connecting tube and positioned in such a manner as to prevent the flow of hydrogen into the vaporization chamber 10, if so desired. The reaction and vaporization chambers 10 and 14, as well as the connecting conduit 16, tubes 22, 24, 28 and 32, and envelope 20, are fabricated from quartz or "Vycor."

Prior to assembling the apparatus, a charge of a non-metallic element selected from groups Vb or VIb of the periodic table, such as sulfur, selenium, tellurium, phosphorus or arsenic, is placed in the vaporization chamber 10 while a charge of a transition metal such as iron, zinc, or cadmium is placed in the reaction chamber 14 by way of portholes 48 and 50 having removable covers 52 and 54. The metal charge 58 is then heated by means of heating coils 36 to a temperature in excess of the melting point of the crystalline compound to be formed and maintained at that point by reason of the heat control means 40 and thermocouple 44.

During synthesis of the compounds, it is necessary that contamination be avoided. This may be effected by introducing pure, dry hydrogen gas into the apparatus after the metal has reached its melting point through tube 24, passing it through the system and expelling it through tube 28 in order to reduce any surface oxide on the metal. Also, a covering of purified Dry Ice may be introduced into the system prior to synthesis and then removed before synthesis is started.

Following the introduction of the hydrogen gas, the system is completely evacuated through the tube 28. Valves 26 and 30 are closed and the vacuum pump is activated in order to evacuate chambers 10 and 14, as well as the interior portion of envelope 20. The entire apparatus is then sealed by closing valves 34 and 56 which leaves the system evacuated and isolated. Evacuation of envelope 20 insures freedom from contamination in the event that the reaction chamber cracks during the cooling procedures.

The vaporization chamber containing the non-metal is then heated by means of heating coils 38 to a temperature which effectuates vaporization of the non-metal charge 12. The vapors of the non-metal are then distilled through the connecting tube 16 to the upper reaction chamber where reaction with the molten metal charge 58 takes place. If the vaporization chamber 10 contains an excess amount of non-metal, that is, an amount in excess of that necessary to form the desired compound, then the vapor pressure of the non-metallic constituent may be controlled by regulating the temperature of the vaporization chamber. Regulation may be effected by means of thermocouple 46 and heat control means 42.

Upon completion of the reaction, the reaction chamber 14 is gradually cooled below the freezing point of the desired compound while the vapor pressure of the non-metal is regulated. When freezing is completed, the resultant compound crystals in the reaction chamber are gradually cooled to room temperature.

In order to obtain satisfactory crystals, the vapor pressure of the non-metallic constituent must be accurately controlled. The pressure should be adjusted so that the composition of the melt, just before the onset of freezing, is that at which the liquidus and solidus curves coincide and, as a result, the crystalline compounds will have the same composition as the melt. If the vapor pressure is not properly regulated, then the solidifying melt will tend to homogenize, while cooling, with the formation of pores.

The course of the reaction which produces the crystalline compounds of this invention may be followed by resorting to the dew-point method using the two sealed-off entrance and exit tubes 24 and 28. The vapor pressure of the non-metal in the tip of the entrance tube 24 is controlled by the temperature within the lower vaporization chamber 10, whereas the vapor pressure of the non-metal in the tip of the exit tube 28 is regulated by its partial pressure over the molten metal and it will equal the pressure in the entrance tube until after the melt has become saturated, that is, upon completion of the reaction.

The connecting tube 16 is affixed to the base of the reaction chamber 14 for two reasons. The first is to allow for the feature described above with respect to controlling the vapor pressure of the non-metal in the tips of tubes 24 and 28. The second reason is that such an arrangement has been found to produce a more rapid reaction. It is believed that this rapid reaction is effected because the metallic constituent is more dense than the resultant crystalline compound and thereby sinks to the bottom of the reaction chamber. Since the non-metallic vapors enter at the bottom of chamber 14, they are able to react immediately with the metallic constituent without the necessity of the vapors diffusing through the compound. A rapid reaction is necessary because of possible divitrification of the quartz or "Vycor" chambers at the reaction-temperature sometimes encountered during synthesis.

The apparatus described herein has been employed for the synthesis of ferrous sulfide. With respect thereto, the composition at which the liquidus and solidus curves coincide may be represented by the formula $Fe_{0.93}S$. The melting point is 1190° C., and the vapor pressure of the sulfur constituent necessary at this temperature is approximately 1.3 atmospheres. The crystals so formed were massive in size and up to three centimeters on an edge.

In the crystal growing process described above, the relative size and placement of the constituents, the chamber temperatures, and the vaporization pressure of the non-metallic constituent are of primary importance to the successful synthesis of highly pure compound crystals of good size and quantity and, therefore, should be properly correlated with respect to the apparatus utilized.

It will be understood that while the apparatus disclosed herein illustrates a preferred form of the invention, various modifications and alterations can be made by those skilled in the art without departing from the spirit and scope of the invention, and that all of the modifications that fall within the scope of the appended claims are intended to be included herein.

I claim:

1. An apparatus for growing crystals of high purity comprising a vaporization chamber, a reaction chamber, means for connecting said reaction chamber to said vaporization chamber, means for selectively introducing a gas into said reaction chamber, exit means connected to said reaction chamber for selectively allowing the escape of said gas therefrom, means for creating a vacuum, means interconnecting said exit means and said vacuum-creating means, an outer envelope surrounding said reaction chamber, means connecting said envelope with said vacuum-creating means, and heating means for said reaction and vaporization chambers.

2. An apparatus in accordance with claim 1 wherein said connecting means extends from the uppermost portion of said vaporization chamber to the lowermost portion of said reaction chamber.

3. An apparatus in accordance with claim 1 including heating means for said connecting means.

4. An apparatus in accordance with claim 1 wherein said vaporization chamber and said reaction chamber each have means for allowing an introduction and removal of material therefrom.

5. An apparatus for growing crystalline compounds of high purity comprising a hollow vaporization chamber, a hollow reaction chamber, connecting means extending from the uppermost portion of said vaporization chamber to the lowermost portion of said reaction chamber and adapted for the passage of a vaporized material therethrough, a source of pressurized gas, valve means between said source of gas and said connecting means for selectively allowing the introduction of said gas into said chambers, an outer envelope surrounding said reaction chamber in a sealed relationship, a vacuum source connected to said envelope and said reaction chamber for simultaneously evacuating the interior portions thereof, valve means positioned between said vacuum source and said chamber for controlling the evacuation of the interior portion thereof, valve means positioned between said envelope and said vacuum source for controlling the evacuation of the interior portion thereof, valve means connected between said reaction chamber and the outer atmosphere for sealing the reaction chamber therefrom, said vaporization chamber and said reaction chamber each having means for allowing the introduction and removal of a material therefrom, heating means for each of said chambers and said connecting means, and means for controlling said heating means to effect temperatures in said chambers and said connecting means within predetermined limits.

References Cited in the file of this patent

UNITED STATES PATENTS

| | | |
|---|---|---|
| 1,286,135 | Somermeier | Nov. 26, 1918 |
| 2,651,566 | Warner et al. | Sept. 8, 1953 |
| 2,763,581 | Freedman | Sept. 18, 1956 |
| 2,909,411 | Krchma | Oct. 20, 1959 |

OTHER REFERENCES

Mellor: "Comprehensive Treatise on Inorganic and Theoretical Chemistry" (1935), vol. 14, page 142 (1st paragraph).